(12) United States Patent
Tanaka

(10) Patent No.: US 7,578,558 B2
(45) Date of Patent: Aug. 25, 2009

(54) SEAT LOCK DEVICE

(75) Inventor: Yukio Tanaka, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

(21) Appl. No.: 12/098,022

(22) Filed: Apr. 4, 2008

(65) Prior Publication Data

US 2008/0296948 A1    Dec. 4, 2008

(30) Foreign Application Priority Data

Apr. 6, 2007    (JP)    ............... 2007-100886

(51) Int. Cl.
*B60N 2/20*    (2006.01)
(52) U.S. Cl. ............................................... 297/378.13
(58) Field of Classification Search ............. 296/65.16, 296/65.17; 297/378.13, 378.12
See application file for complete search history.

(56) References Cited

U.S. PATENT DOCUMENTS 4,765,682 A * 8/1988 Satoh ................... 297/378.13
5,855,414 A * 1/1999 Daniel et al. ........... 297/378.13
7,410,217 B2 * 8/2008 Inoue et al. ............ 297/378.13

FOREIGN PATENT DOCUMENTS

| JP | 60-88638 A | 5/1985 |
|---|---|---|
| JP | 2006-248330 A | 9/2006 |

* cited by examiner

*Primary Examiner*—Milton Nelson, Jr.
(74) *Attorney, Agent, or Firm*—Sughrue Mion, PLLC

(57) ABSTRACT

A seat lock device for fixing a rotatable seat back of a rear seat to a vehicle body includes: a striker which is disposed in the vehicle body; a lock mechanism which includes a base plate which is mounted to a seat back frame inside the seat back and has an engagement groove engaging with the striker, a latch which holds the striker in the engagement groove, a ratchet which maintains the latch in a lock direction and a release lever which moves the ratchet in a lock release direction; and a rod spring of which one end is attached to the seat back frame and of which the other end is bowed while coming into contact with the striker during a locking operation.

2 Claims, 5 Drawing Sheets

FIG. 4A
FIG. 4B
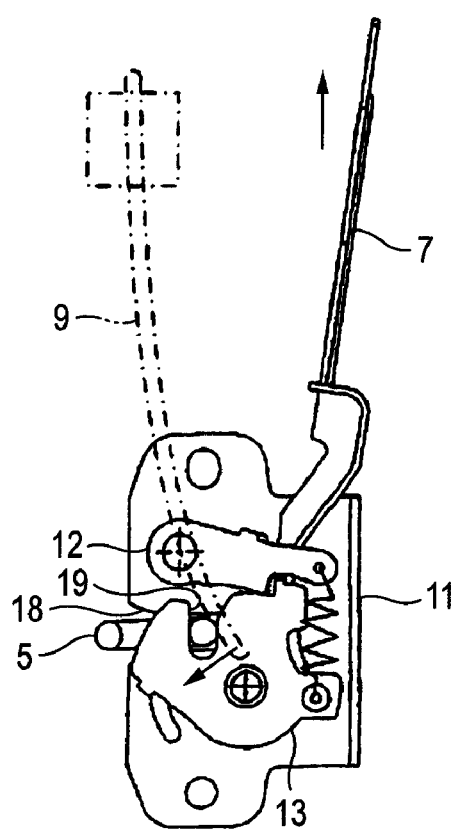
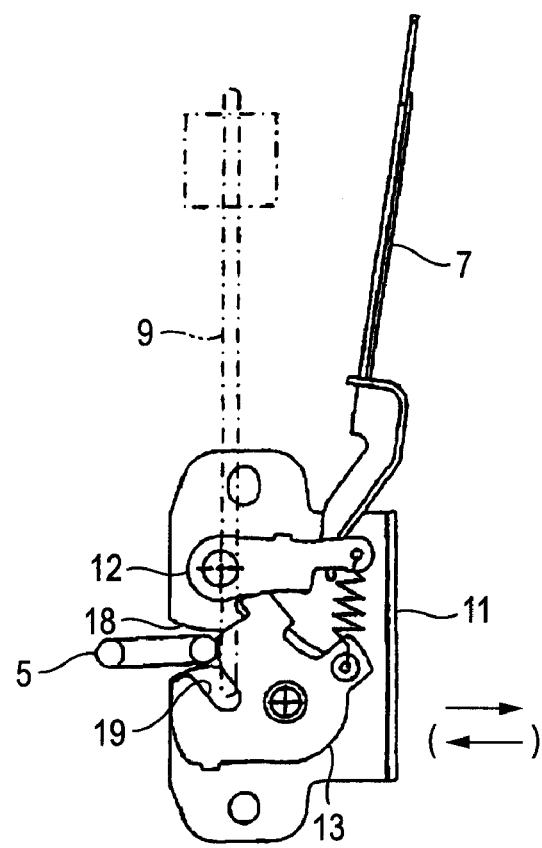

SEAT LOCK DEVICE

BACKGROUND OF THE INVENTION

1. Field of the Invention

The present invention relates to a seat lock device and more particularly, to a seat back device which applies forward-folding torque to a seat back of a seat upon releasing a seat lock state.

2. Description of Related Art

In general, a vehicle seat includes a seat, a seat back and a head rest. JP-A-2006-248330 discloses a seat lock device which fixes the seat back of a rear seat of a vehicle so as to be able to be folded forward. When it is configured that the seat back is able to be folded forward, it is possible to move a baggage from a baggage room to a vehicle room or to use the baggage room as wide as possible. The seat lock device fixes the upper portion of the seat back to a vehicle body so as to be attached thereto or detached therefrom, thereby preventing the upper portion of the seat back from oscillating during a driving. Alternatively, a bottom portion of the seat back may be axially supported so as to rotate. JP-A-60-88638 discloses an example in which a spiral spring is mounted to the bottom portion of the seat back. When the spiral spring is used and then the seat lock device is released, it is possible to easily fold forward the seat back in a horizontal posture by a force built up in the spiral spring.

When the rear seat is heavy and strong, it is necessary for the spiral spring to build up a force enough for folding forward the seat back. This is because the seat back is rotated about one end as a base thereof in the state where the seat back is inclined at about 120 degree from the horizontal position to the rear side. When a force of the spring becomes strong, elastic force becomes strong, so that the seat back is abruptly folded forward.

When a motor for auxiliary assisting the rotation of the seat back is employed, and the seat back is rotated so as to be erected from the substantially horizontal posture, at the timing of application of a repulsion of the spiral spring, there is a fear that it is misjudged that human body or a baggage is interposed between the seat back and the vehicle body and the motor is driven to invert and the seat back is returned to its original position. This case is shown in FIG. 5. A solid line indicates a rotation cycle of a motor to which no load is applied and a dashed line indicates a rotation cycle at the time something is inserted in the seat back. This is an example in which it is erroneously detected that the repulsion force of the spiral spring corresponds to a case where something is pinched between the seat back and the vehicle body when a slope angle of the seat back, that is, a recliner reaches a position at about 30 degree.

When attempting to attach the spiral spring as a helper spring of a forward-folding operation to a rotation center, it is necessary to provide the spiral spring for generating torque large enough to endure a weight of the seat back. At this time, when a sufficient clearance between a vehicle trim and a seat is not ensured, a problem arises in that it is difficult to design a layout in which the spiral spring is attached to the vehicle without giving a foreign-object feeling to a passenger.

SUMMARY OF THE INVENTION

An object of the invention is to provide a seat lock device which applies forward-folding torque to a seat back by using a simple mechanism.

In order to achieve the above-described object, according to a first aspect of the invention, there is provided a seat lock device for fixing a rotatable seat back of a rear seat to a vehicle body, including:
  a striker which is provided on the vehicle body;
  a lock mechanism which includes:
    a base plate which is mounted on a seat back frame in the seat back and has an engagement groove engaging with the striker;
    a latch which moors the striker in the engagement groove;
    a ratchet which maintains the latch in a lock direction; and
    a release lever which moves the ratchet in a lock release direction; and
  a rod spring including:
    one end attached to the seat back frame; and
    the other end allowed to be bowed by coming into contact with the striker during a locking operation.

According to a second aspect of the invention provides the seat lock device according to the first aspect of the invention, wherein a surface of the striker is coated with resin.

According to the seat lock device of the first aspect, since there is provided the rod spring which is bowed while coming into contact with the striker during a lock operation, the rod spring strikes the striker upon releasing the lock operation and thus it is possible to apply forward-folding torque to the seat back. Accordingly, since the seat back is surely away from the lock mechanism, even when the seat back is rotated manually or by a motor, it is possible to continuously and easily fold forward the seat back. Since the rod spring comes into contact with the striker during the lock state, it is possible to apply forward-folding torque to the seat back continuously. For this reason, even when a vehicle body vibrates, it is possible to maintain the latch and the ratchet without clattering.

According to the seat lock device of the second aspect of the invention, since the surface of the striker is coated with resin, it is possible to prevent abnormal sound from occurring when the rod spring comes into contact with the striker.

BRIEF DESCRIPTION OF THE DRAWINGS

FIG. 4A is an explanatory view illustrating a locked state of the lock mechanism according to Embodiment 1 of the invention; and FIG. 4B is an explanatory view illustrating a state immediately after the lock state is released of the lock mechanism according to Embodiment 1 of the invention.

DETAILED DESCRIPTION OF THE PREFERRED EMBODIMENTS

Hereinafter, a seat lock device according to an exemplary embodiment of the invention will be described with reference to the accompanying drawings.

Embodiment 1

Figure 1:
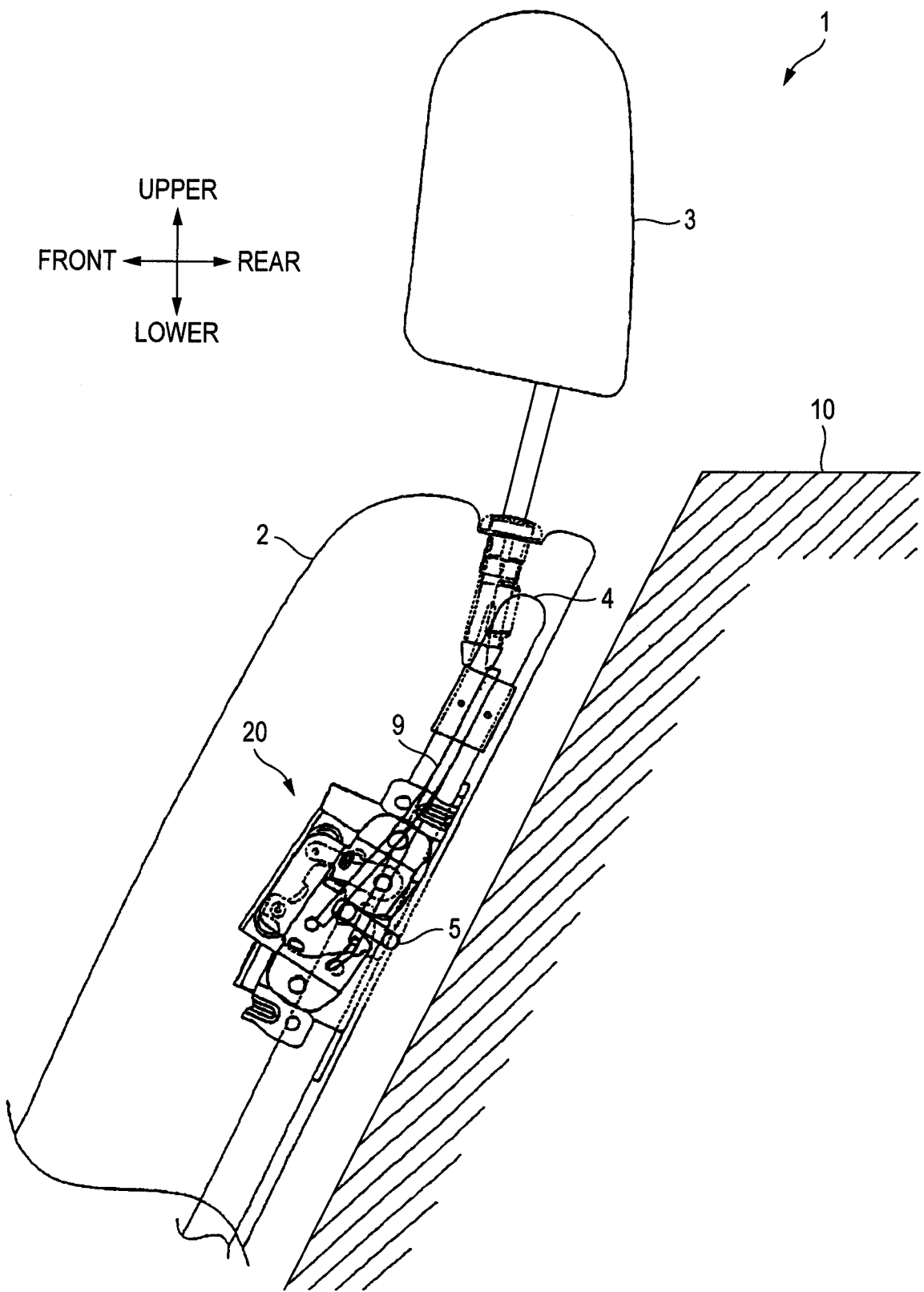
FIG. 1 is a sectional view illustrating a configuration of a seat lock device according to Embodiment 1 of the invention.

FIG. 1 is a sectional view illustrating a configuration of a seat lock device according to the invention. A rear seat 1 includes a seat (not shown), a seat back 2 and a head rest 3. In FIG. 1, only the upper portion of the rear seat 1 is shown. A seat lock device 50 includes a lock mechanism 20, a striker 5 and a rod spring 9. The lock mechanism 20 is disposed in the upper portion of the seat back 2 of the rear seat 1 of a vehicle. The striker 5 is disposed in a vehicle body 10 on the left and right sides instead of the vehicle body 10 on the rear side shown by a slant line. In FIG. 1, the lock mechanism 20 engages with the striker 5. The lock mechanism 20 is attached to a seat back frame 4 in the seat back 2. One end of the rod spring 9 is attached to the seat back frame 4 and the other end of the rod spring 9 is disposed at a position in which the other end thereof is bowed while coming into contact with the striker 5 during a lock state. It is preferable that the rod spring 9 is made of spring steel. In FIG. 1, when the lock state is released, since a bottom portion of the seat back 2 is axially supported so as to rotate, the seat back 2 can be folded forward. Since forward-folding torque unit=(distance)×(force), since the rod spring 9 applies the fold-forward force to the lock mechanism 20, when the lock mechanism 20 is located at the upper portion of the seat back which is far away from the axially supporting point of the bottom portion, the same torque can be obtained by small force. Thus, required repulsion force of the spiral spring can be reduced.

Figure 2:
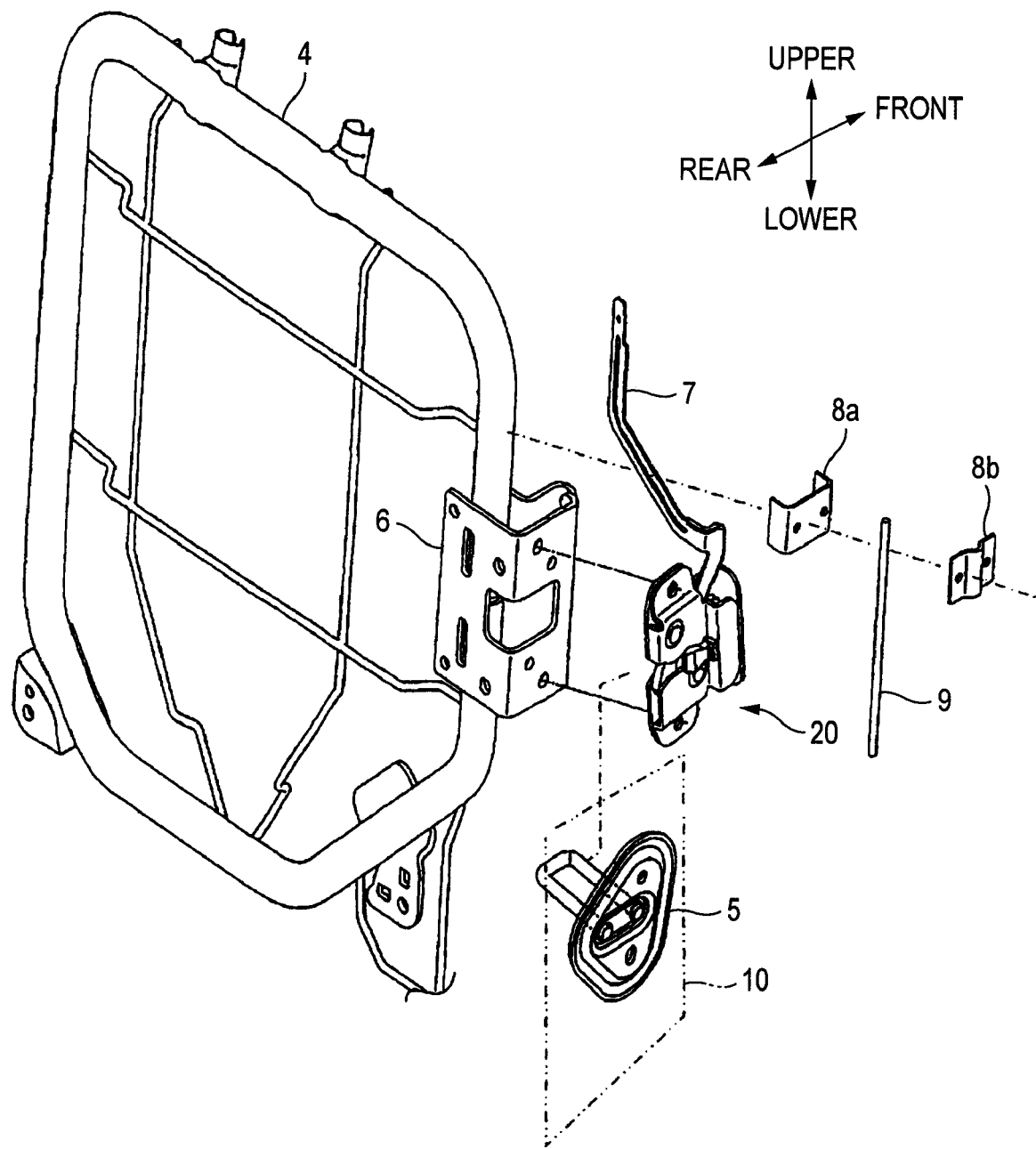
FIG. 2 is a perspective view illustrating an attachment state of a lock mechanism, a rod spring and a striker according to Embodiment 1 of the invention.

FIG. 2 is a perspective view illustrating an attachment state of a lock mechanism, a rod spring and a striker. As shown in FIG. 2, the striker 5 is attached to one side of the vehicle body 10. The lock mechanism 20 including a release lever 7 is attached to a pedestal 6 attached to the seat back frame 4. The rod spring 9 is inserted into the pedestal 6 and is attached to the seat back frame 4 by use of yokes 8a and 8b. Accordingly, when the seat back frame 4 is folded backward, the lock mechanism 20 engages with the striker 5 and simultaneously the striker 5 pushes forward the front end of the rod spring 9 to be bowed.

Figure 3:
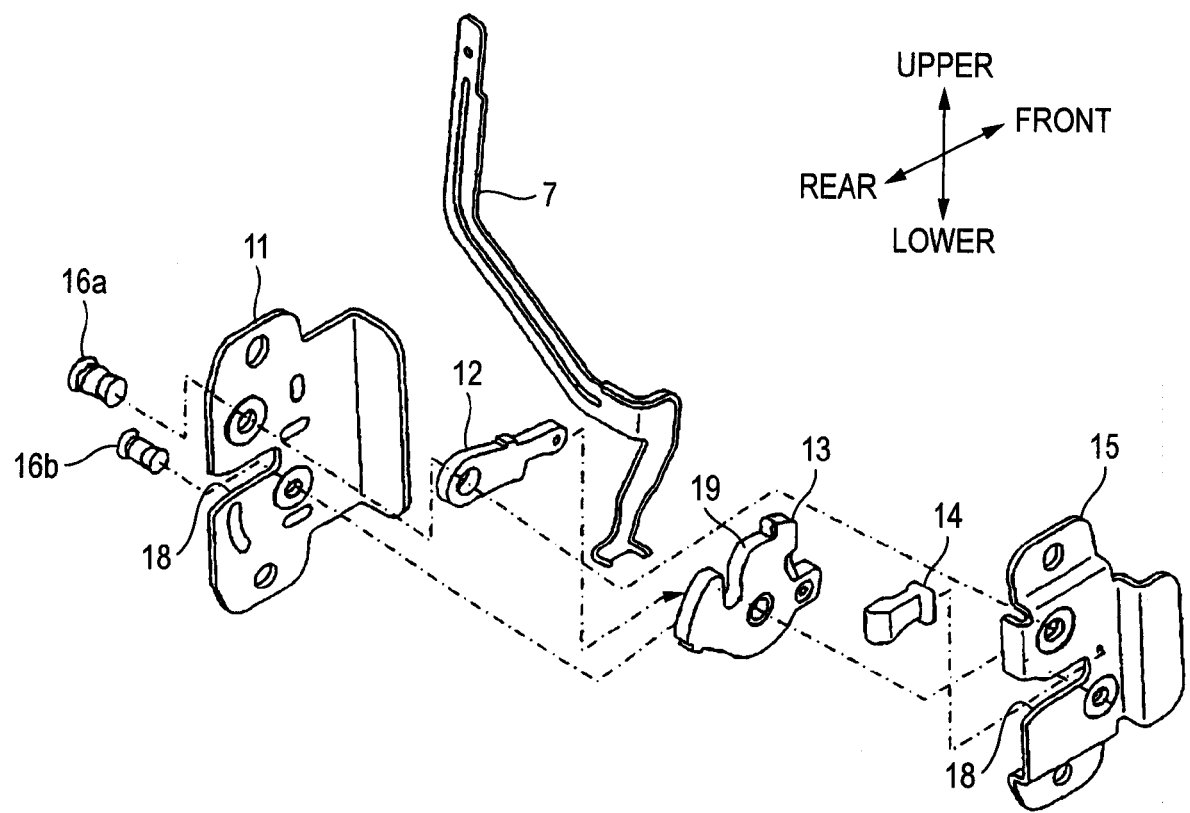
FIG. 3 is a perspective view illustrating the lock mechanism according to Embodiment 1 of the invention.
Figure 5:
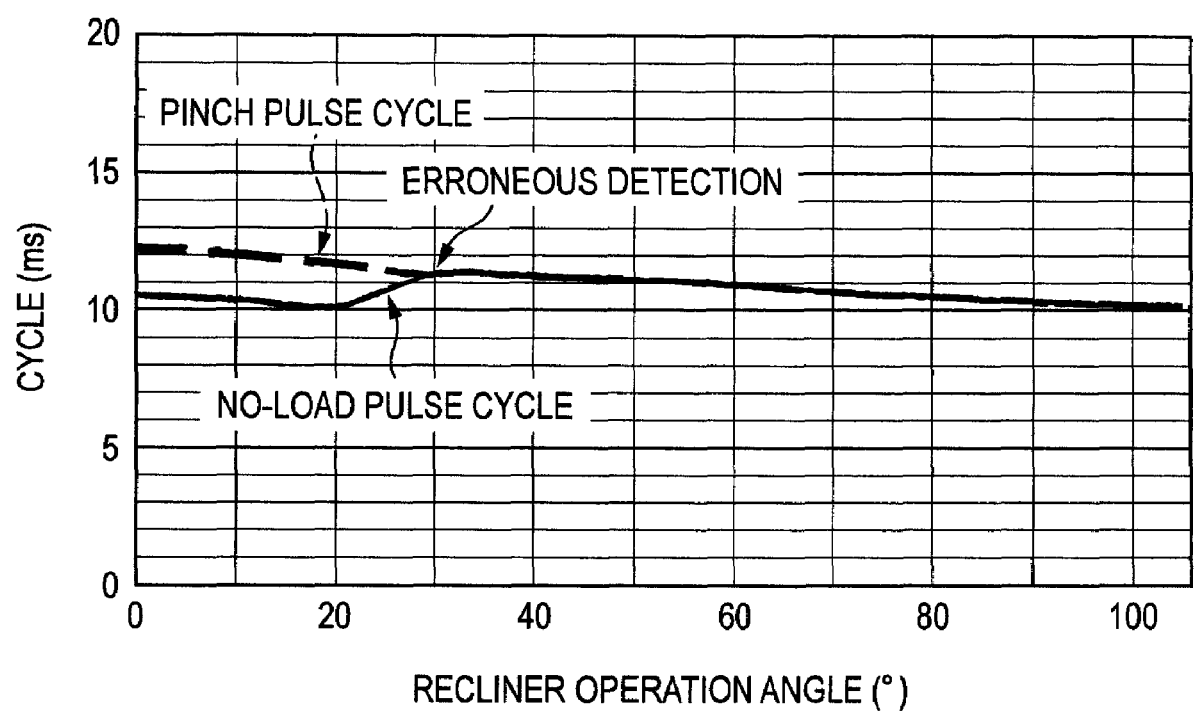
FIG. 5 illustrates a state where an insertion is erroneously detected in a seat back which is controlled by a motor and a spiral spring according to a known example.

FIG. 3 is a perspective view illustrating the lock mechanism. As shown in FIG. 3, the release lever 7, a ratchet 12 and a latch 13 are inserted between a base plate 11 and a side plate 15. Through-holes for pins 16a and 16b are formed in the base plate 11 and the side plate 15. Engagement grooves 18, with which striker 5 engages, are formed from the center to the backside. The ratchet 12 is a claw which allows the latch 13 not to rotate in a counterclockwise direction and when the ratchet 12 is detached from the latch 13 by the release lever 7, the latch 13 rotates in the counterclockwise direction. The latch 13 is provided with a concave portion 19 which surrounds the striker 5. A stopper 14 made of resin is disposed in an inner side of the engagement groove 18 of the side plate 15 and restricts abnormal sound from occurring when the striker 5 comes into contact with the engagement groove 18. Additionally, a spring 17 (which is shown in FIG. 4) is disposed between the ratchet 12 and the latch 13.

FIG. 4 is an explanatory view illustrating an operation of the lock mechanism. FIG. 4A illustrates a lock state. FIG. 4B illustrates a state immediately after the lock state is released. In FIG. 4A, the striker 5 engages with an engagement groove 18 and pinched by a concave portion 19 of the latch 13. Although the lower end of the rod spring 9 is bowed forward and drives to rotate the latch 13 in the counterclockwise direction, the ratchet 12 interrupts the rotation of the latch 13. Here, when the release lever 7 is pulled upward, the ratchet 12 is rotated in the counterclockwise direction so that the claw is detached from the latch 13. Then, as shown in FIG. 4B, the latch 13 is immediately rotated to a position below the ratchet 12. At the same time, since the rod spring 9 strikes the striker 5, the seat back 2 including the lock mechanism 20 moves forward by use of forward-folding torque.

FIG. 4B illustrates a state immediately before the locking operation. In the state shown in FIG. 4B, when the seat back 2 is strongly pushed backward, the latch 13 is rotated in a clockwise direction by the striker 5 and the striker 5 is pinched by the concave portion 19, so that the striker 5 is held in the engagement groove 18. Although the striker 5 advances forward in the engagement groove 18, the striker 5 stops upon coming into contact with the stopper 14. Meanwhile, although the rod spring 9 is bowed and drives to rotate the latch 13 in the counterclockwise direction, since the ratchet 12 comes into contact with the latch 13, the rotation of the latch 13 in the counterclockwise direction is interrupted. Here, the locked state is established.

Since the rod spring 9 is bowed during the lock state, it is possible to maintain the latch 13 and the ratchet 12 without clattering by use of repulsion force. In the forward-folding force of the rod spring 9, since the rod spring 9 is located a position far away from the rotation point of the bottom portion of the seat back 2, it is possible to obtain large forward-folding torque by comparatively small force.

With such a configuration, since a timing that the rod spring 9 comes into contact with the striker 5 is just before the seat back 2 is in an erection state. In this timing, since the seat back 2 is substantially elected and there is not formed a large gap therebetween, there is no fear that the passenger is pinched therebetween.

Thus, as for the inclination angle of the seat back at this timing, it is preferable to set the pinch detection sensor in OFF state. According to this set condition, although the automatic returning motor is equipped, there is no fear of occurrence of such the glitch of stopping the motor at the time of generation of repulsion force of the rod spring 9. Therefore, according to the present invention, with the simple construction, it is prevented from occurrence of the glitch of stopping of the motor.

The seat lock device according to the invention may be applied to a rotatable rear seat of a vehicle.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A seat lock device, intended for use in fixing a rotatable seat back frame, of a rear seat, to a striker of a vehicle body, the seat lock device comprising:
   a lock mechanism which includes:
      a base plate being mountable on the seat back frame, and having an engagement groove adapted to engage with the striker;
      a latch to moor the striker in the engagement groove;
      a ratchet which maintains the latch in a lock direction; and
      a release lever which moves the ratchet in a lock release direction; and
   a rod spring including:
      one end, to attach to the seat back frame; and
      the other end, allowed to be bowed by coming into contact with the striker during a locking operation.

2. A seat locking system, comprising:
   a rotatable seat back frame of a rear seat;
   a striker of a vehicle body;
   a lock mechanism; and
   a rod spring;
   wherein:
      the lock mechanism comprises:

a base plate mounted on the seat back frame and having an engagement groove engaging with the striker, a latch to moor the striker in the engagement groove, a ratchet to maintain the latch in a lock direction, and a release lever adapted to move the ratchet in a lock release direction;

one end of the rod spring is attached to the seat back frame;

the other end of the rod spring is allowed to bow by coming into contact with the striker during a locking operation; and a surface of the striker is coated with resin.

* * * * *